(12) United States Patent
Baldwin et al.

(10) Patent No.: US 8,643,680 B2
(45) Date of Patent: Feb. 4, 2014

(54) GAZE-BASED CONTENT DISPLAY

(75) Inventors: Leo B. Baldwin, Livermore, CA (US); Edwin Joseph Selker, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 181 days.

(21) Appl. No.: 13/083,303

(22) Filed: Apr. 8, 2011

(65) Prior Publication Data

US 2012/0256967 A1    Oct. 11, 2012

(51) Int. Cl.
*G09G 5/00* (2006.01)

(52) U.S. Cl.
USPC .......... 345/684; 345/156; 345/166; 345/581; 345/619; 345/688

(58) Field of Classification Search
None
See application file for complete search history.

(56) References Cited

U.S. PATENT DOCUMENTS

| | | | | |
|---|---|---|---|---|
| 5,850,211 A * | 12/1998 | Tognazzini | | 345/158 |
| 2002/0180799 A1* | 12/2002 | Peck et al. | | 345/784 |
| 2009/0196460 A1* | 8/2009 | Jakobs et al. | | 382/103 |
| 2010/0125816 A1* | 5/2010 | Bezos | | 715/863 |
| 2011/0128223 A1* | 6/2011 | Lashina et al. | | 345/158 |

* cited by examiner

*Primary Examiner* — Jwalant Amin
(74) *Attorney, Agent, or Firm* — Novak Druce Connolly Bove + Quigg LLP

(57) ABSTRACT

A user interface can enable a user to control the display of content in a way that is natural for the user and requires little physical interaction. The gaze direction and/or viewing location of a user can be determined using any of a variety of imaging or other such technologies. By determining the location at which the user is gazing, an electronic device can control aspects such as the scroll rate or page turns of displayed content. In many cases, a device utilizes the natural reading or viewing style of a user to determine appropriate aspects for that user, and can update automatically as conditions change based at least in part upon the change in gaze location and/or viewing patterns.

25 Claims, 8 Drawing Sheets

GAZE-BASED CONTENT DISPLAY

BACKGROUND

People are increasingly relying upon electronic devices to access various types of content, such as news articles, Web sites, and digital books. In many cases, users must navigate the content by scrolling a mouse, pressing navigation keys, or otherwise performing tasks that repeatedly, and for an extended period of time, require the user to position at least one hand or other body part in a specific location to interact with the device. Portable devices offer some flexibility, but a user still typically must hold or support the device in such a way that the user can access the navigational elements of the device. In cases where the user is unable to hold or access such elements, due to any of a number of potential physical limitations or even just the current position of the user, the user can have limited access to the content, or can at least become frustrated or uncomfortable in the ways in which the user must navigate the content.

BRIEF DESCRIPTION OF THE DRAWINGS

Various embodiments in accordance with the present disclosure will be described with reference to the drawings, in which:

FIG. 10 illustrates an example process for managing the display of information in response to user input that can be used in accordance with various embodiments;

DETAILED DESCRIPTION

Figure 1:
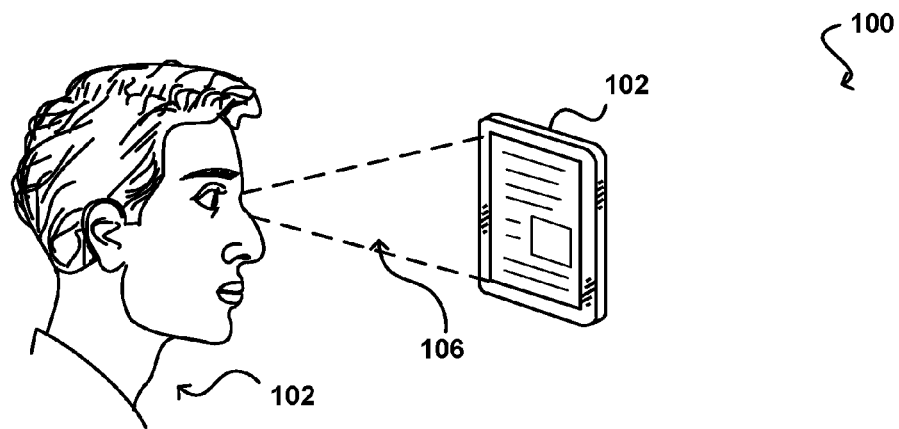
FIG. 1 illustrates an environment in which a user is able to lance at an electronic device to view information in accordance with various embodiments.

Systems and methods in accordance with various embodiments of the present disclosure may overcome one or more of the aforementioned and other deficiencies experienced in conventional approaches to enabling a user to interact with, or control, a system, device, interface, or other such object or element in an electronic environment. Various embodiments enable a user to control a display of information using natural motions and instincts, providing minimal distraction or additional effort on the part of the user. In at least some embodiments, a display of content on an electronic device can scroll, update, refresh, or otherwise adjust based at least in part upon the gaze direction or viewing location) of the user. The gaze direction of a user can be monitored over time and changes in the gaze direction can be used to control specific aspects of a user interface. If the interface is displaying text, such as may be part of an electronic book or Web page, for example, the device can cause the text to scroll or otherwise adjust based at least in part upon the speed and/or location at which the user is reading, as may be determined by changes determined in that user's gaze.

In some embodiments, different areas of a device display can be assigned to different zones. Each zone can correspond to a different action, such as to scroll at a different rate, switch to a different page, stop at the current display, etc. In other embodiments, there will not be discrete zones but instead at least a semi-continuous function will be applied to different areas of the display such that adjustments to the content can be made in a relatively smooth and natural manner. Such an approach enables text or other content to be presented to the user with the feeling of a continuous surface that is "never-ending." A feedback loop utilizing gaze information can be used to control that surface based on natural user motion. Since the determination of gaze generally will not need to be extremely precise (e.g., accurate to within about 5% in one embodiment), a relatively low resolution camera or other such sensor or element can be used to capture information to make the necessary determinations.

There also can be various locations that can have specific graphical elements assigned, such as icons, buttons, or thumbnail images. In at least some embodiments, specific commands can be assigned to at least some of these elements, such as to move to a different page or open a menu. In some embodiments, images of at least a certain size can be removed from the text portion and moved to a separate area, such that the user can read the text without having to load the full image. If the user is interested in seeing the image, the user can look at a thumbnail or other icon corresponding to that image, and the image can be loaded and/or displayed over top of, or in addition to, the corresponding text. Once the user is done viewing the image, the user can look back to the text (or perform another such gaze adjustment) which can cause the picture to be removed from the display. Various other actions can be taken as well as discussed elsewhere herein.

In at least some embodiments, a device can distinguish between a "gaze" and a "glance" based at least in part upon the amount of time at which the user's view dwells at a specific location. For example, a device might not make an adjustment to the displayed content when the user is determined to be engaged in a eye gesture referred to herein as "glancing" at an area of the device, wherein the gaze direction of the user is determined to be substantially towards a location for a relatively short period of time (e.g., less than a minimum threshold amount of time). If a user looks at an area of a display element of the device and then looks away in less than half a second, for example, the user might be determined to have glanced at that area and an action might not be taken. If the user continues to direct the gaze direction towards the location for a longer period of time, referred to herein as "gazing" at that location, the appropriate action might be taken. In some embodiments, relatively small adjustments such as may be the result of reading a line of text might still be considered a "gaze" for purposes of providing input, while glances such as looking quickly at a thumbnail at the edge of the screen to see if it is of interest might not result in any update of the display.

In some embodiments, the device can capture and analyze image information around the device in order to attempt to recognize a nearby user and distinguish that user from any other people near the device. Such an approach enables the device to ensure that input is being processed for one user and/or the proper user, and prevents other persons nearby from accidentally, or intentionally, interacting with the device. In some embodiments, facial recognition can be used to ensure that input is only received from an authorized or primary user of the device. In other embodiments, a device might track an "active" user such that input is only received from that person while active, even where the device does not necessarily recognize that person. A device can monitor a user's reading patterns, for example, which can help to set or select zones or input functions that are appropriate for the current user.

Various other applications, processes and uses are presented below with respect to the various embodiments.

FIG. 1 illustrates an example situation 100 wherein a user 102 is viewing content being displayed on an electronic device 102. While viewing the content on the device, the viewing angle or gaze direction will fall within a given range 106, where that range is relative depending upon factors such as movement of the user or device, etc. As the user is viewing content near the bottom of a page being displayed, the viewing angle can be near the bottom of that range. Similarly, while the user is viewing content near the top of that page the viewing angle can be near the top of that range.

Figure 2:
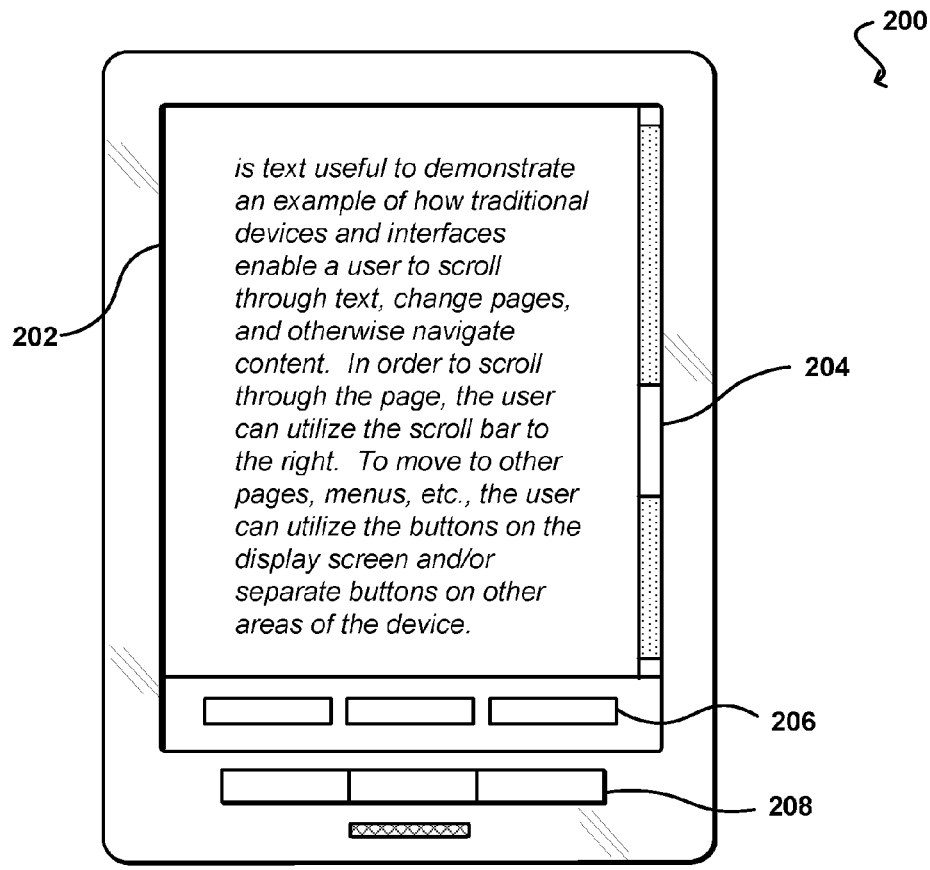
FIG. 2 illustrates example approaches for navigating content using an electronic device.

FIG. 2 illustrates an example device 200 including a number of different conventional methods for navigating content displayed on the device. While reading content on the device 200, a user's viewing location will typically fall within the area corresponding to the display screen 202, except when the user is performing another task, looking for an input button, etc. In many devices, there are physical buttons 208 or other such pressable elements on the exterior of the device. If a user wants to move to a different page or perform another such action, the user often must locate and press the appropriate button. In some devices, such as where the device has a touch screen, the user can select a virtual button 206 or other selectable element displayed on the display screen 202. In many cases there will be at least one selectable element that enables a user to scroll up or down at a specific speed. If a user wants to scroll faster or slower, the user may have to utilize a separate element, such as a virtual scroll bar 204 displayed on a side (or other) area of the display screen. Various other input mechanisms are known and used as well, such as a computer mouse, touch pad, joystick, etc.

As discussed above, however, these mechanisms generally rely on a user being in frequent contact with at least some of these elements in order to navigate through content displayed on such a device. If the user is reading a book for an extended period of time, for example, the user typically must hold the device in such a way that the user can easily press the appropriate button at the end of each page. If the user is reading content on a stationary device, such as a desktop computer, the user typically must sit in such a way as to have frequent access to a computer mouse or other such navigation device. This can at least be uncomfortable for a user over long periods of time, but can also potentially prevent a user from accessing the content in a useful way if the user is unable to easily access the necessary navigational elements.

Systems and methods in accordance with various embodiments can take advantage of the fact that devices are increasingly equipped with imaging elements such as cameras or infrared sensors, and thus can capture image information of a user of the device. This image information can be analyzed to determine a relative viewing location or gaze direction of a user. Based at least in part upon such determinations, a device can accept input from a user based upon changes in the relative gaze direction in a way that is natural and relatively easy for a user to provide. In many cases, the user might not even realize that the device is capturing input from the user.

Figure 3:
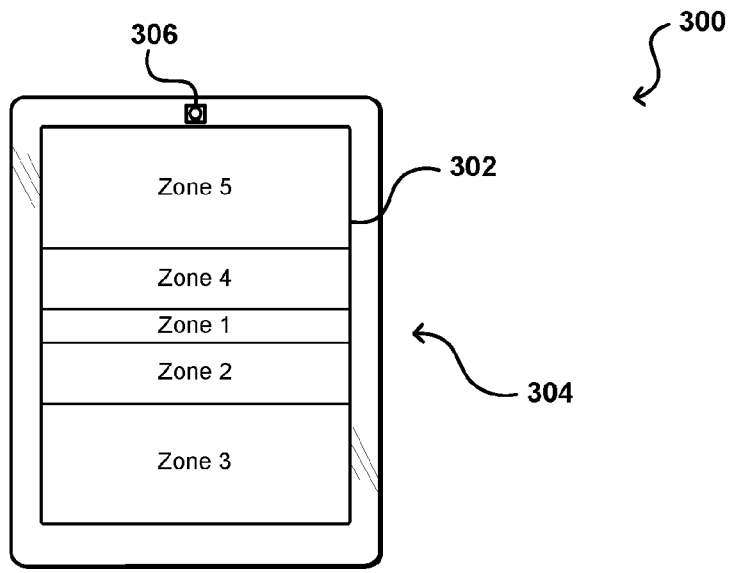
FIG. 3 illustrates an example set of navigational zones that can be used with an electronic device in accordance with various embodiments.

FIG. 3 illustrates an example device 300 wherein at least one imaging element 306 of the device is able to capture information about a user viewing information displayed on a display element 302 of the device. As discussed in more detail elsewhere herein, the imaging element 306 is able to capture one or more images of a user viewing the display element 302 in order to determine a current viewing location of the user with respect to the display. In this example, a navigation algorithm is used that divides the display screen up into five different zones 304, although it should be understood that any appropriate number of zones could be used in any appropriate arrangement in accordance with the various embodiments. In this example, the algorithm controls a rate and/or amount of scrolling of information displayed on the display element. It is intended that the user primarily looks at content displayed in Zone 1, which can be referred to herein as a target zone or range of target viewing locations. When the user is looking at content in Zone 1, the content will scroll (assuming more content below than can fit on the display element, among other such factors) at a specified rate. This specified rate can vary between users, but generally corresponds to the approximate reading speed of the user. For example, if at the current font size and line spacing the user reads at about one line per second, the content will scroll at about one line per second when the user has a viewing location in Zone 1. It should be understood that "line" in this context can include any line spacing or other such elements. Thus, as long as the viewing location of the user is in Zone 1 and there is more content to scroll, the display can continuously scroll the content at a substantially constant rate that substantially matches the reading speed of the user under the current conditions.

As illustrated, there also are a number of other zones positioned above and/or below Zone 1. In this example, Zone 2 is just below Zone 1. When the user's gaze direction moves down to Zone 2, the device can determine that the current scrolling speed is too slow, and can increase the scrolling speed such that the user's viewing location while reading or viewing content is slowly moved back up to Zone 1. The adjustment can be slow enough that the user likely does not notice that the viewing location is moving, or at least is not distracted by the adjustment. If the user's gaze direction moves closer to the bottom of the screen such that it is determined to be in zone 3, the scrolling speed can increase again in order to more quickly direct the user's viewing location back up to Zone 1.

Similarly, if the content is scrolling too quickly, the user's viewing location might move up above Zone 1. For example, if the user's viewing location moves up to Zone 4, the device might stop scrolling, may slow scrolling, or even can start scrolling backwards at a certain rate. In some embodiments, there can be different zones for slowing, stopping, reversing, etc. Such an approach enables the user's gaze direction to be moved back down to Zone 1. In at least some embodiments, this action can also result in a slightly slower scroll speed being associated with Zone 1 under, the current conditions and/or for the current user. If the user is falling way behind, the viewing location might move up to Zone 5, which can result in the content scrolling backward (e.g., scrolling "up") at a faster rate.

As discussed, the ability to determine the user's viewing location with respect to the device and adjust the scroll accordingly enables a user to provide input in a natural way that might not even be noticeable to the user. Further, the user does not need to physically interact with the device or provide input. Further still, such an approach can adapt for specific conditions, such as the fatigue level of the user, the complexity of the subject matter, the font size, line spacing, and other such aspects, automatically and without any knowledge of the user, as the device can automatically adjust to the current reading (or viewing) speed of the user at the current time for the currently displayed content.

In addition to scrolling based on the user's current reading speed, for example, such an approach also enables a user to locate content in a way that is natural to the user, and without additional types of input required. For example, a user might want to go back to content that the user previously viewed. A natural approach to locating such content would be to look or visually scan up, or back, to find that content. In the example of FIG. 3, a user looking at Zone 5 (or even closer to the top edge of the display screen) can quickly scroll up to previously viewable content. Similarly, the user can skip forward to content by looking down towards the bottom of the display element in Zone 3, which would be a natural reaction for someone wanted to skip ahead to a later section of the content. In some embodiments, there can be specific zones that forward more quickly (e.g., by paragraph, page, topic, or chapter) when the user is detected to be gazing at one of those zones.

Such an approach also enables the device to adjust speeds automatically as things change. For example, a user might read the introduction to a text book at one speed, but might read the actual problems or description section at a slower speed. One user might hand the device to another user with a different reading or viewing speed. There might be different fonts, font sizes, or spacings for different content. Any of a number of other such factors also could change the user's effective reading or viewing speed, which can automatically be detected and accounted for by determining the current zone for the user's gaze direction.

In some embodiments, however, at least some learned and/or stored information can be used to more quickly arrive at the appropriate viewing speed. For example, at least one reading signature could be obtained and stored for each user of the device. Upon the user being recognized to the device, such as by the user logging in or by the user being recognized via facial recognition or another such approach, the device can load values for each zone for that particular user. Such an approach prevents an initial ramp up period where a five year old and a college professor would potentially start at the same scrolling speed. Rate information also can be stored for various other factors. For example, "easy" to read content might have a certain scrolling speed or scrolling factor associated therewith, while "difficult" to read content might have another scrolling speed or factor. In at least some embodiments, the default scrolling rate might be a product of the scrolling speed for the user and the scrolling factor for the difficulty of the content. For example, a user with a scroll speed of one line per minute might have an effective scroll speed of two lines per minute for comics and half a line per minute for text books, which might correspond to a scroll factor of 2.0 for comics and 0.5 for text books.

Various other factors can be considered with the default scroll speed as well, such as the time of day and location. A user might read at one speed during the day and another at night. Similarly, a user might read at one speed while at work, another while at home, and another while at the beach. While the device can automatically adjust for variations, it can be desirable in at least some embodiments to attempt to set the initial scroll speed as closely as possible in order to improve the overall experience of the user.

In order to further improve the user experience, interfaces in accordance with various embodiments can utilize approaches that are more granular and/or continuous than the zone-based approach. In the example of FIG. 3, the scroll speed might jump noticeably when the user's eyes move from Zone 2 to Zone 3. Such an approach can be less than desirable in at least some situations, as users can accidentally overshoot or undershoot specific content, or just might not appreciate the sudden change. Accordingly, in at least some embodiments a function (continuous, step-wise, or other) can be used that smoothes out the variations in scroll speed such that the user might not even notice the difference in speed.

Figure 4A:
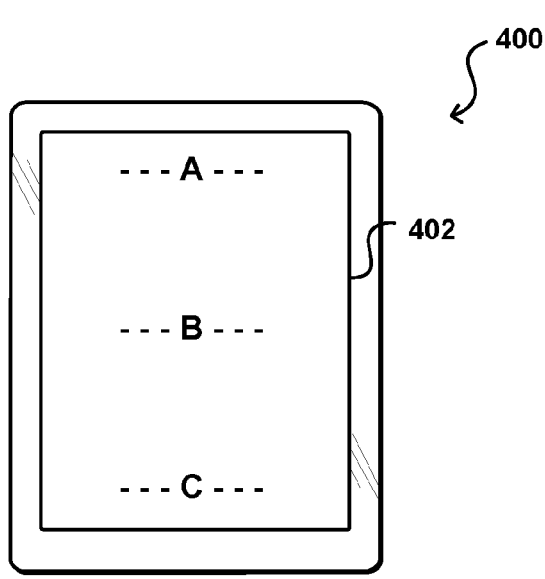
FIGS. 4(a) and 4(b) illustrate an example approach for smooth gaze-based scroll control that can be utilized in accordance with various embodiments.

For example, consider the device 400 illustrated in FIG. 4(*a*). For purposes of explanation there are three points on the display 402 designated as A, B, and C. In the example of FIG. 3, these might have corresponded to Zones 5, 1, and 3, respectively. In this example, however, the device utilizes a continuous function to determine scroll speed. FIG. 4(*b*) illustrates two example functions that can be used to determine scroll speed in accordance with various embodiments. In this example, the scroll speeds vary from forward at about 20 lines per second when near point C to backward about −20 lines per second when near point A. In one embodiment, a substantially linear function 422 is utilized, such that the scroll speed varies substantially linearly with distance. Thus, as the user's viewing direction drifts towards point C from point B, the scroll speed will increase at a substantially constant rate (assuming no substantial variations in the drift). Since the midpoint of the screen (around point B) might actually correspond to the target scroll rate for the user, the point at which the content stops scrolling might actually be above point B, such that the scroll rate at point A might not be the opposite of that at point C.

In at least some cases, however, it might be desirable to adjust the scroll speed less when the viewing location is near the intended location, and adjust the scroll speed more near the edges of the display. Accordingly, a non-linear function 424 can be used that changes less around point B and faster around points A and C. Thus, the device can determine the current viewing location for the user with respect to the display screen, and based on the approximate location can determine the scroll speed according to the function. Such an approach can allow for gentle changes that might not even be noticeable to the user.

The function used might also vary based on the type of content. For example, digital novels might have a function similar to that of function 426 where a substantially constant viewing style of the user will be used to view that content (i.e., the user will likely read the content line by line). For content such as magazines or Web sites where content might be organized differently, and a user might only look at certain areas, the appropriate function might be quite different.

Figure 4B:
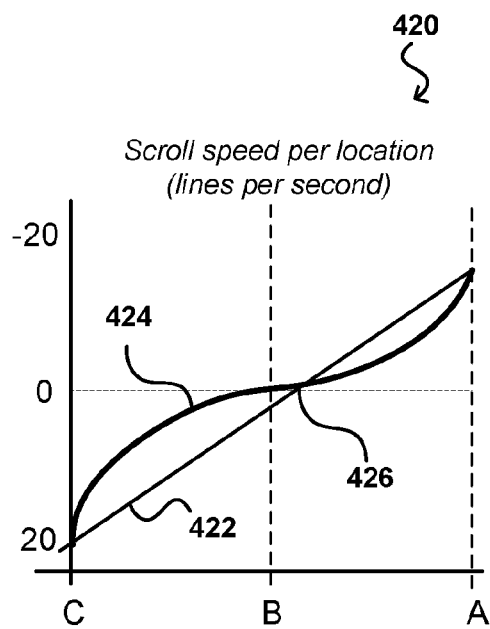

Further, the function might intentionally be varied over time. In one embodiment, a user reading content for a long time might get eye fatigue if glancing at exactly the same location for an extended period of time. A device in accordance with certain embodiments can adjust the function such that the user's gaze location is varied slowly over time, enabling the user's eyes to get exercise without the user even potentially being aware of the movement. In the example of FIG. 4(b), the functions could be adjusted such that the "sweet spot" of point B is slowly moved up and down the page, using a sinusoidal, random, or other such approach. Similarly, in the example of FIG. 3, the position of Zone could be moved up and down (or otherwise) relative to the display in order to provide some exercise of the user's eyes. In some embodiments, the movement can happen by default, or after a minimum amount of time reading or viewing content. In other embodiments, the device might attempt to detect fatigue by the user's expressions, movements, posture, eyelid shape, or any other aspect indicative of fatigue. In at least some embodiments, the device can utilize the same image capture process to detect fatigue as to determine gaze position, user identity, etc.

It should also be mentioned that similar approaches can be used for other types of content navigation as well. For example, certain interfaces might scroll content from right to left or left to right. Similar algorithms can be used to determine scroll speed, as may be determined using vertical zones, etc. In some cases, such as for low vision users where only a small number of words are displayed on the screen at any given time due to font size constraints, the scroll speed can be determined based on the number of words or other such aspects.

Figure 5:
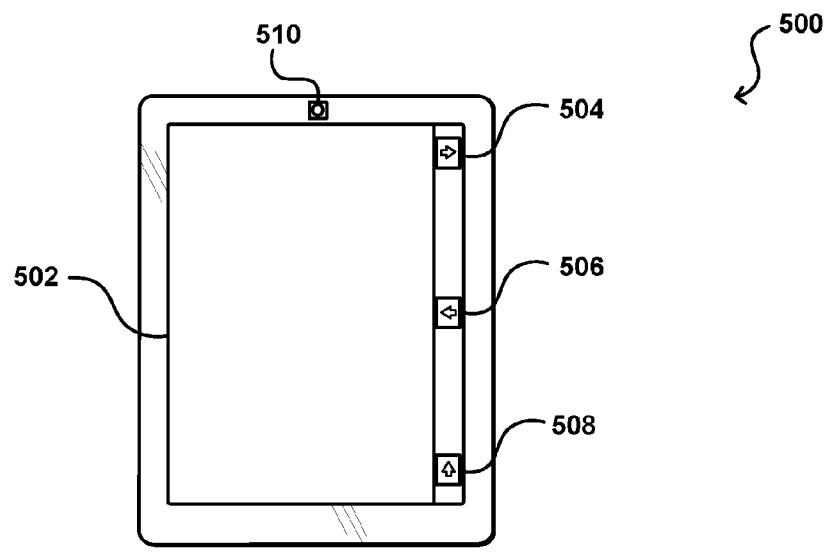
FIG. 5 illustrates an example gaze-based interface that can be utilized with an electronic device in accordance with various embodiments.

As discussed, in some situations scrolling might not be sufficient to navigate through certain areas of the displayed content. For example, a user wanting to skip forward to the next chapter of a book might not want to have to scroll through the current chapter using an algorithm discussed above. While conventional options such as pressing a physical button can be used, approaches in accordance with various embodiments can enable a user to navigate content by looking at specific areas of the device or display screen. For example, FIG. 5 illustrates an example device 500 wherein the interface displayed on the screen 502 includes a number of graphical elements 504, 506, 508, such as icons or other images. In at least some embodiments each of these has an associated function, and in the case of a touch screen might even be touch-selectable by a user. If the device 500 is able to use at least one image capture element 510 to determine gaze direction as discussed herein, the device can accept input to move to a different chapter, go to a menu, or perform another such task based at least in part upon the fact that the user is determined to be gazing at one of those graphical elements 504, 506, 508. For example, the user could gaze at element 504 in order to skip to the next chapter, or element 508 to go to the top or beginning of the current chapter or section. In embodiments where the device has physical buttons to perform such functions, the device might be operable to determine when the user is gazing at a physical button, instead of a portion of the display screen, and accept the appropriate input.

Figures 6A, 6B:
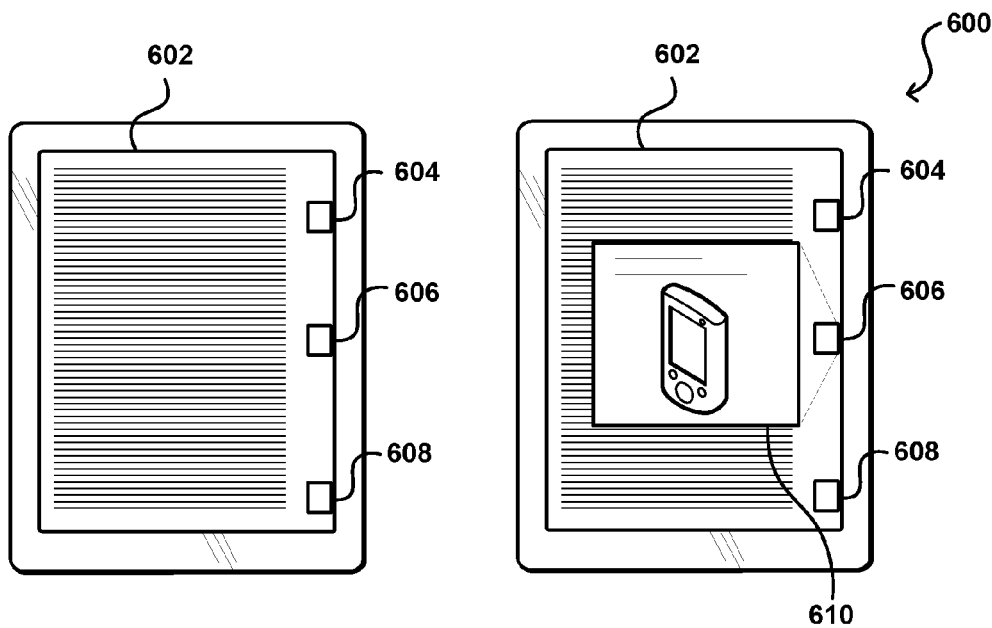
FIGS. 6(a) and 6(b) illustrate an example gaze-based interface that can be utilized with an electronic device in accordance with various embodiments.

In some embodiments, elements can be separated from other portions of the content for improved readability, load speed, or other such reasons. For example, a Web site might include a number of pictures that might not be of interest to the user, but could delay the loading of the page and/or degrade the reading experience of the user. Accordingly, approaches in accordance with various embodiments can separate out images, video, or other such elements from the text or other such portions. In the example of FIG. 6(a), the images have been removed from the text displayed, and in their place a set of thumbnail images 604, 606, 608 have been positioned along the side of the display 602. It should be understood that icons or elements other than thumbnails can be used to designate images, and that the elements could be positioned at any appropriate location on a display element of the device. In this example, the user can continue to read the text without interruption and using a scrolling approach discussed above. If the user gets to a point where the user wants to view one of the images, the user can gaze at the appropriate thumbnail or element. For example, in FIG. 6(b) the user is detected to gaze at element 606. By gazing at element 606, the corresponding image 610 can be displayed, such as in a modal or popup window or other such display. Thus, the user can view the image if and when the user gazes at the corresponding element. In some embodiments where a thumbnail is displayed, the user can have the ability to glance at the thumbnail without opening the image, with the image only opening after the user has gazed at the thumbnail for a minimum amount of time. The user can cause the image to no longer be displayed by looking back to the text, or in another appropriate location. Such an approach is also relatively natural for a user, as the user would look at the image element when the image is of interest, and would look back to the text when the image is no longer of interest. As discussed, such elements could be used to present other types of content as well, such as audio, video, games, or other media files.

Figure 7:
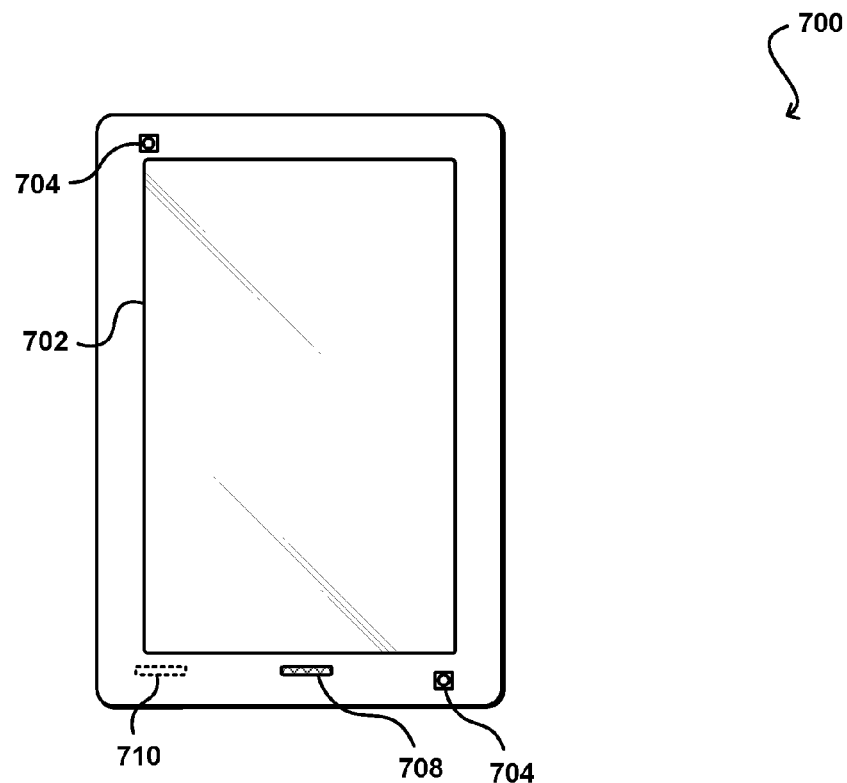
FIG. 7 illustrates an example computing device including elements operable to capture gaze information that can be used in accordance with various embodiments.

FIG. 7 illustrates an example of a computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702, which under normal operation will display information to a user facing the display screen (e.g., on the same side of the computing device as the display screen). The computing device in this example can include one or more image capture elements, in this example including two image capture elements 704 on the front side of the device, although it should be understood that image capture elements could also, or alternatively, be placed on the sides or corners of the device, and that there can be any appropriate number of capture elements of similar or different types. Each image capture element 704 may be, for example, a camera, a charge-coupled device (CCD), a motion detection sensor, or an infrared sensor, or can utilize any other appropriate image capturing technology. The computing device can also include at least one microphone 708 or other audio capture element(s) capable of capturing other types of input data. At least one orientation-determining element 710 can be used to detect changes in position and/or orientation of the device. Various other types of input can be utilized as well as known in the art for use with such devices.

Figure 8:
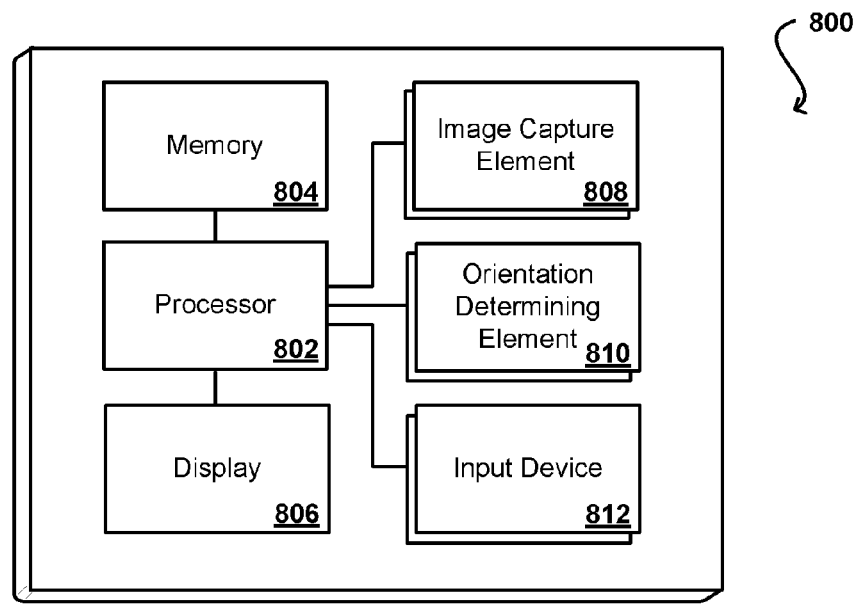
FIG. 8 illustrates example components of a computing device such as that illustrated in FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808 able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a, computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user or an application, or retrying to determine an audio input or other device. In some embodiments, a device can include an infrared detector or motion sensor, for example, which can be used to activate an imaging element, image analysis, etc. For example, a device might not capture and analyze image information; then there is not a user in the room. If an infrared, detector (i.e., a detector with one-pixel resolution that detects changes in state) detects a user entering the room, for example, the device can activate a camera in an attempt to locate the user, perform image analysis, etc.

The device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/0 devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

In at least some embodiments, a device can utilize at least one image capture element and/or audio capture element to attempt to recognize or authenticate the identity of a particular user. In one example, there might be several people sitting around a table on which the device has been placed, and these people might shift positions over time. If the device is able to capture images of these people, or capture voice data, etc., the device can attempt to identify at least the primary user of the device, if not others around the device. In some embodiments the device can use image or voice recognition, while in other embodiments heat signatures or other appropriate types of information can be used. Being able to determine the identify of the primary user can help to ensure that only the appropriate user is able to provide input to the device, and that input is not inadvertently processed for other persons who might also be glancing at the device. In some embodiments, the ability to tell that a person who is not an authorized user is glancing at the device can cause the device to perform other actions, such as to turn off a display or only show certain types of information, in order to prevent unauthorized users from viewing private or sensitive information on the device. In some embodiments where there can be multiple authorized users, the ability to recognize the identity of a given user can enable the device to display information at a rate or following an access pattern in ways that are customized for that user. For example, if a husband and wife share a device and the wife is gazing at the device, the device can display information at a rate that has been determined for the wife. Various other differences in functionality can be presented based on user identity as well within the scope of the various embodiments.

Figure 9:
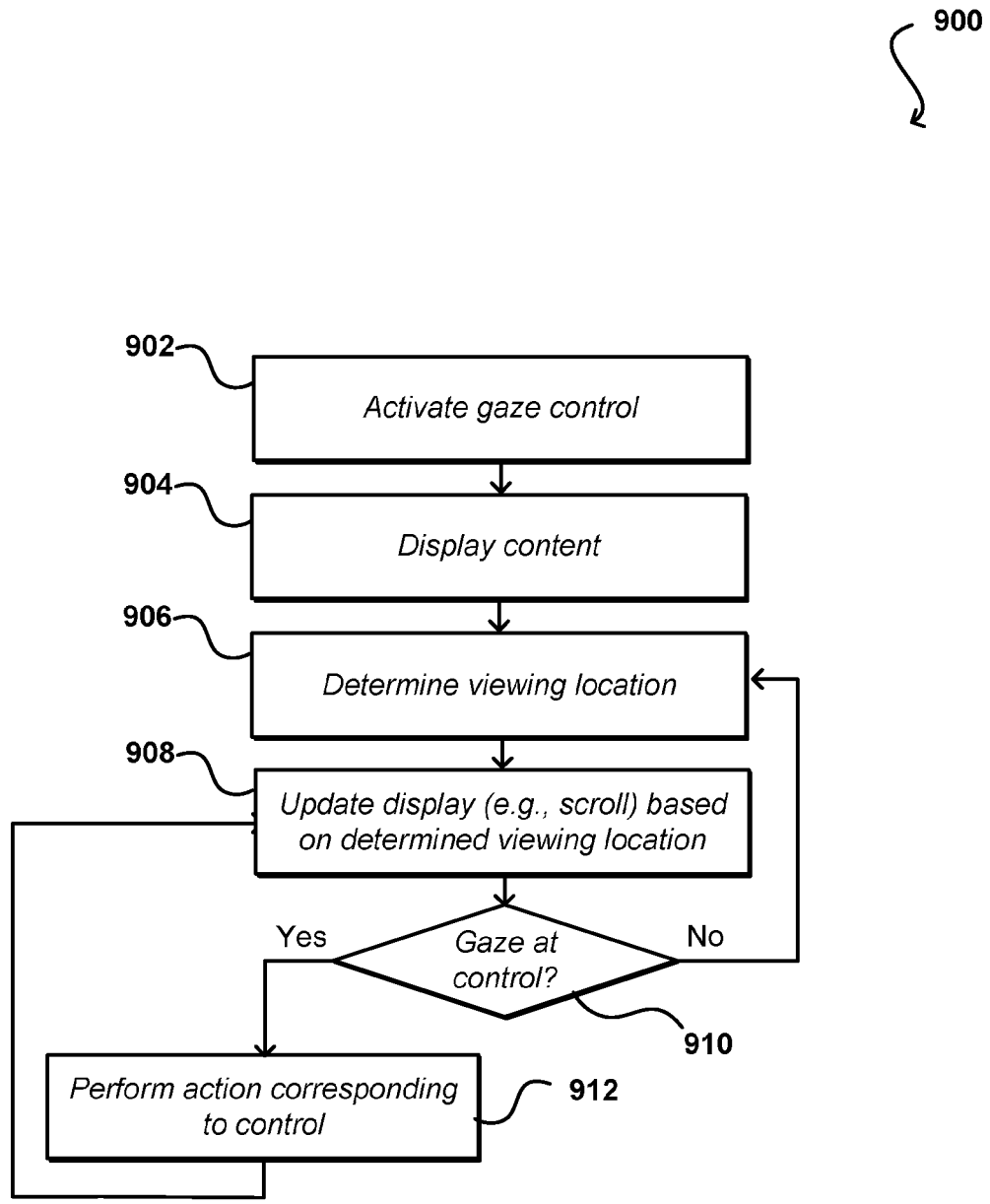
FIG. 9 illustrates an example process for determining user input that can be used in accordance with various embodiments.

FIG. 9 illustrates an example of a process 900 for updating a display of content that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, gaze tracking is activated on the device 902 some embodiments a user must activate this mode manually, while in other modes the device can activate the mode when the user is detected in a range of relative locations, when the device is determined to be held by a user, when a specific application is opened, or at any other appropriate time. Other modes of activation are possible as well. In addition to activating gaze control, content can also be displayed to the user on at least one display element of the device 904. The content can be selected using any appropriate approach, and can be displayed before, after, or at substantially the same time in which gaze tracking is activated. When gaze tracking is active, the device can image around the device, whether in all directions, some directions, a specific range of directions, or a direction substantially toward an identified user. As discussed, in some embodiments the imaging will involve ambient light image or video capture, while other embodiments can utilize infrared imaging, heat signature detection, or any other such approach. The device can analyze the captured image information to attempt to locate facial features (e.g., eyes) or otherwise identify aspects that will help to determine a gaze direction and/or viewing location of the user 906.

Once the viewing location is determined, the device can update the display of information in a way that is determined at least in part by the current viewing location 908. As mentioned previously, this can include updates such as scrolling at a certain speed or navigating to a specific location in the content. If the user is determined to be gazing at a specific control 910, such as an icon representing a specific action or input, the device can perform the corresponding action 912. The action can be any appropriate action discussed or suggested herein, such as moving to a different section of the content. The viewing location can be tracked and or monitored such that with any variation in viewing location or gaze direction the device can update the display of content accordingly.

Various other inputs can be enabled as well within the scope of various embodiments. For example, a page turn might be determined by a specific movement of a user's eyes. When tracking gaze, it might be difficult to determine whether the user is reading the last line or next-to-last line on a page, depending on aspects such as resolution, lighting, or viewing angle. In order to avoid turning a page prematurely, a device can instead wait for an additional or alternative input from a user. A user will naturally, in most cases, adjust the gaze direction to the beginning of a new page when a page is turned. For typical English readers, for example, the user will adjust the gaze location from the lower right of a display to the upper left. In at least some embodiments, a device can wait until such an eye motion is detected by the user before updating to the next page or otherwise displaying a new section of content. Such an input can be natural for many users.

Other inputs can be enabled as well. For example, a user might be able to bookmark or highlight a section or passage by dwelling the user's gaze on that location for a minimum period of time, winking, nodding, or performing another such action. A user can also look to a specific icon, such as a highlight icon, then re-read the section to be highlighted. The text will continue to be highlighted until the user looks back at the highlight option or performs another such task. Various other inputs can be enabled as well using similar approaches.

A model can be developed for a user using information learned from, or received by, a user. As discussed, reading speed under various conditions can be learned for a user, and a reading speed model can be generated. Further, a user can assign certain actions to various inputs, such as winking or looking at a specific icon, which can be added to the model. When a user is identified through login, facial recognition, reading signature, or other such information, the appropriate model can be used to customize the interface and/or adjust the control scheme for the user.

Figure 10A:
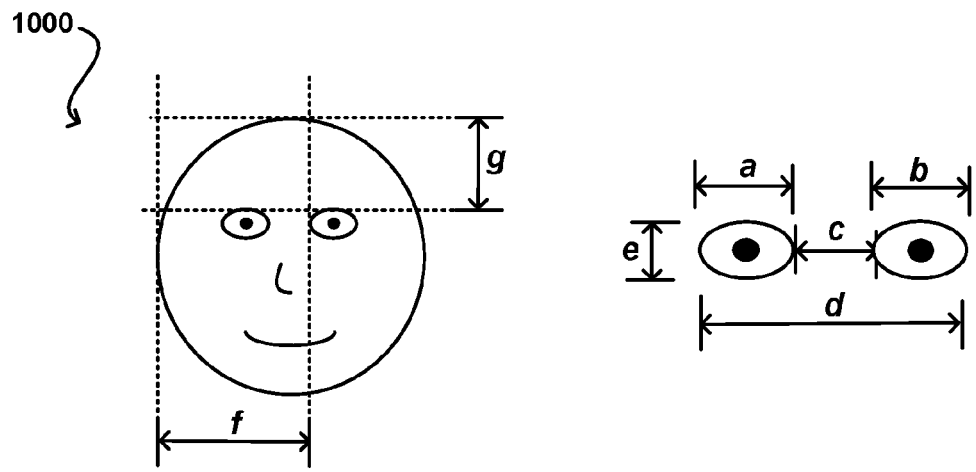
FIGS. 10(a)-10(c) illustrate example approaches to determining glance direction that can be used in accordance with various embodiments.
Figure 10B:
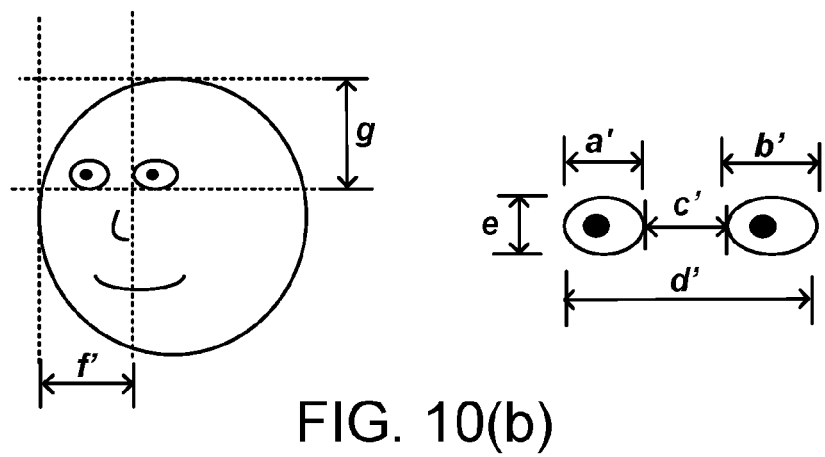
Figure 10C:
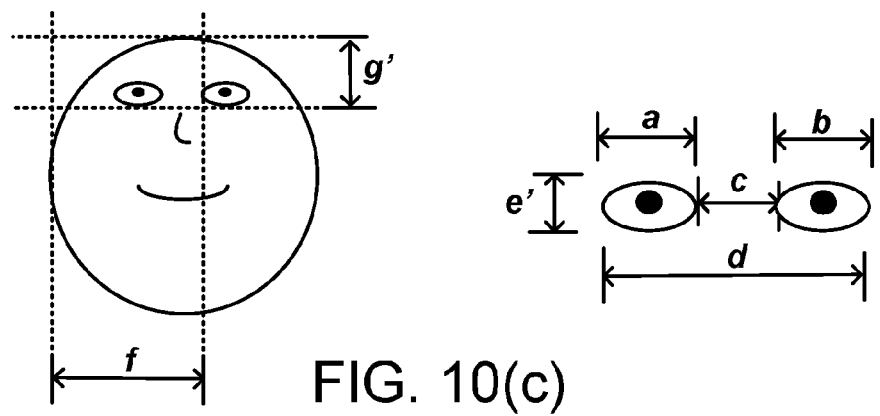

In order to determine the gaze direction of a user for such a process, the device in at least some embodiments has to determine the relative position of the user relative to the device, as well as dimensions or other aspects of the user at that position. FIG. 10(a) illustrates an example 1000 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 10(b) illustrates a case where the user is looking "left" (or to the user's right"), such that a center point of each user's pupil is to the left (in the image) of the center point of the respective eye. Similarly, FIG. 10(c) illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device. A system in some embodiments can differentiate between different types of movement, such as between eye tremor, smooth tracking, and ballistic movements. In some embodiments, a user can provide specific input though various eye gestures, such as for a glance or gaze associated with a specific ballistic movement. A system could also require no ballistic movement in a continued gaze for certain input or actions, such as to enable a user to obtain additional information of the current type.

In one embodiment, a user calibrates a device by looking at each of a number of targets on a screen, such as at each corner, whereby the device can detect relative positions of the pupils to the eyes of the user for different locations on the display. Thus, when a user looks to a certain portion of the display, the device can act accordingly. For example, if a user is reading an electronic book, the device can automatically scroll the page up, or turn to the next page, when the user gets to the bottom of the current page. In another example, a user can select from a number of elements on the display simply by looking at that element. In other embodiments where the device cannot determine the user's gaze accurately enough to select an isolated portion of the screen, the device may sequentially present the user with different choices one at a time. The user might accept a choice, when it appears on the screen, with a blink or other such action or gesture. In one example, a user might submit a search query and receive a list of search results. A user can view the results, and, if one of the results is of interest to that user, the user can submit input while looking at that item. For example, a user can look at the fourth item on the list and perform an action such as blinking twice or saying the word "open" and the device can determine to open a document corresponding to the element at which the user is looking. A user looking at a specific area of interest also can cause the display to zoom into that area and the surrounding area (any number of times) until a specific area of interest is identified. In some cases, a user might look at a position on the display and say "zoom" or perform a detectable motion such as nodding forward. In another example, if there are multiple levels to a display, or if there are multiple "zoom" levels, the display can automatically zoom in or out depending on where the user is looking, as long as the user looks for a sufficient period of time. For example, if a user is looking at a map and looks at a particular state, after a few seconds the display might zoom in to show that particular state (and maybe surrounding states). If the user looks to another state while zoomed in, the display can either shift to that state or zoom out whereby the user can select another state. A display also can have icons or elements corresponding to zoom commands, such that a user wanting to zoom in can look at a "zoom in" element and may also look at the specific area at which the user wants to zoom. The display can take these inputs and zoom at the desired location. Further, any distinguishable eye gesture might be available to control the zoom or other action. A blink, wink, or rolling of eyes can all be distinguishable gestures that could potentially augment an action such as zooming or selecting items.

Figure 11A:
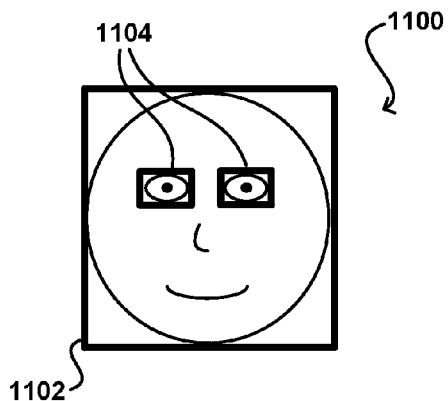
FIGS. 11(a)-11(f) illustrate example approaches to determining user input that can be used in accordance with various embodiments.

Various approaches can be utilized for locating one or more desired features of a user's face to determine various aspects useful for determining relative orientation. For example, if a user's head is to be used as input, there can be many objects that can be shaped similar to a human head that could give false readings. Also, a user nodding "no" might not actually move the position of the user's head enough to register the movement. Accordingly, various approaches utilize features such as a user's eyes to assist in position and movement determination. For example, an image can be analyzed to determine the approximate location and size of a user's head or face. FIG. 11(a) illustrates an example wherein the approximate position and area of a user's head or face 1000 is determined and a virtual "box" 1102 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1104 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth.

Figure 11B:
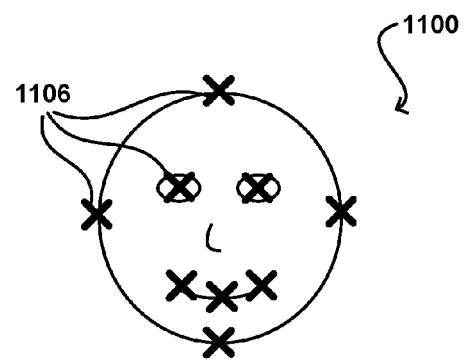

Various other algorithms can be used to determine the location of features on a user's face. For example, FIG. 11(b) illustrates an example wherein various features on a user's face are identified and assigned a point location 1106 in the image. The system thus can detect various aspects of user features and can determine changes such as movement or change in shape or expression. Such an approach provides advantages over the general approach of FIG. 11(a) in certain situations, as various points along a feature can be determined, such as the end points and at least one center point of a user's mouth. Accordingly, expressions such as a smile or frown can be captured even though the overall position of the user's mouth or face did not move.

Figure 11C:
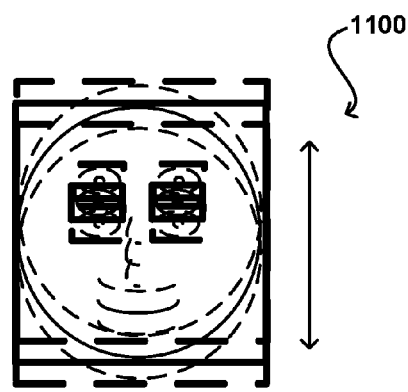
Figure 11D:
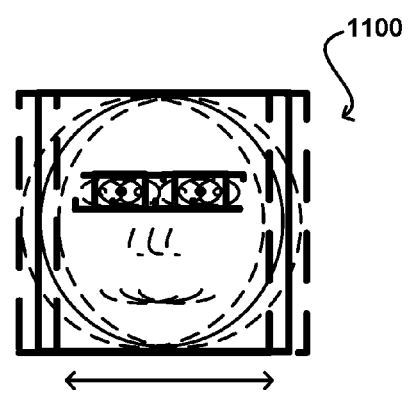
Figure 11E:
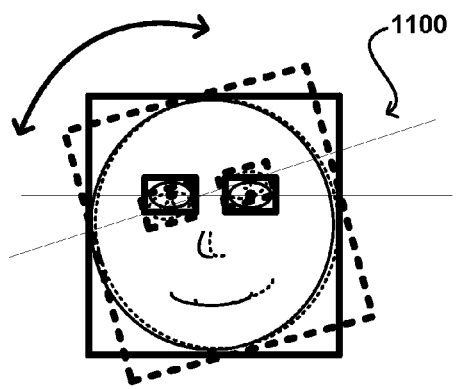

Once the positions of facial features of a user are identified, relative motion between the user and the device can be detected and utilized as input. For example, FIG. 11(c) illustrates an example where the user's head 1100 is moving up and down with respect to the viewable area of the imaging element. As discussed, this could be the result of the user shaking his or her head, or the user moving the device up and down, etc. FIG. 11(d) illustrates a similar example wherein the user is moving right to left relative to the device, through movement of the user, the device, or both. As can be seen, each movement can be tracked as a vertical or horizontal movement, respectively, and each can be treated differently as an input to perform a specified function. In one example, the monitored movements are used to control the position of a cursor on the interface display by following the up, down, and across motions. As should be understood, such a process also can detect diagonal or other such movements. FIG. 11(e) further illustrates an example wherein the user tilts the device and/or the user's head, and the relative change in eye position is detected, as a rotation. In some systems, a "line" that corresponds to the relative position of the eyes can be monitored, and a shift in angle of this line can be compared to an angle threshold to determine when the rotation should be interpreted as input.

Figure 11F:
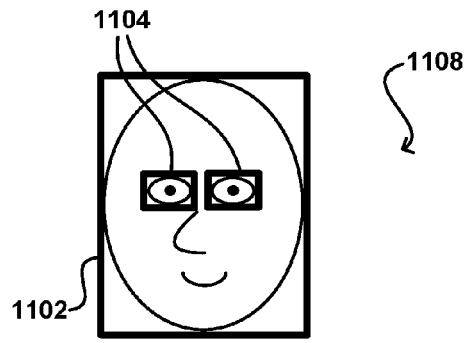

FIG. 11(f) illustrates another advantage of using an approach such as that described with respect to FIG. 11(b) to determine the position of various features on a user's face. In this exaggerated example, it can be seen that the features of a second user's head 1108 have a different relative position and separation. Thus, the device also can not only determine positions of features for a user, but can distinguish between different users. As discussed later herein, this can allow the device to perform differently for inputs from different users. Also, the device can be configured to detect how close a user is to the device based on, for example, the amount and ratio of separation of various features, such that the device can detect movement towards, and away from, the device. This can help to improve the accuracy of gaze detection.

Further, although many embodiments are described with respect to facial features and/or head movements, it should be understood that a device can capture and analyze other types of movement useful for providing input. For example, a user might be able to manipulate a cursor on a display by changing a hand position or "drawing" in the air. A user also might be able to hold up a number of fingers to provide numerical input, such as by holding up three fingers, then two fingers, then four fingers (possibly followed, by some end command) to input the number "324". In one embodiment, a user can hold up any number of fingers in any distinguishable orientation to provide input, and in some embodiments can use representations (e.g., letters, words, or phrases) to provide input. For example, if a user is filling out a form to purchase an item and needs to fill in a shipping address, the user might be able to perform a motion such as holding up a specific finger, making a motion for "home", or any other appropriate motion, whereby the device knows to fill in the form using the "home" address information stored for the user.

It also should be understood that complex motions used for input can involve a combination of facial movements and device movements. For example, a user wishing to shut the device down might perform actions such as tilting the device to the right and then nodding up and down. In this way any eye, head or hand gesture can be used; a wrinkling of the brow, a winking of an eye, and a tipping to the side can all be distinguishable. Any of a number of combinations of actions to act as inputs should be apparent to one of ordinary skill in the art viewing the teachings and suggestions contained herein.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, fall color images.

In at least some embodiments, a device is able to distinguish between movement of the user and movement of the device, such as by detecting movement of a background or other aspect of the images, by analyzing the separation, shape or size of various features, or using movement sensing elements such as an accelerometer. Thus, in embodiments described herein that use the image capture element to determine an orientation or location of the device relative to its user, a user can have an option of inputting a given type of motion which corresponds to a specific command by moving the device, altering an aspect of the user or both. Further, the direction of audio capture can be adjusted based at least upon the determined action, such as a tilting of the device as measured by an accelerometer or gyroscope, to improve upon the precision of the image analysis.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing, cameras can detect infrared radiation, but typically utilize an IR filter. Utilizing these cameras without the IR filter, and potentially with an ambient light filter, can allow these relatively inexpensive cameras to be used as IR detectors.

Figure 12:
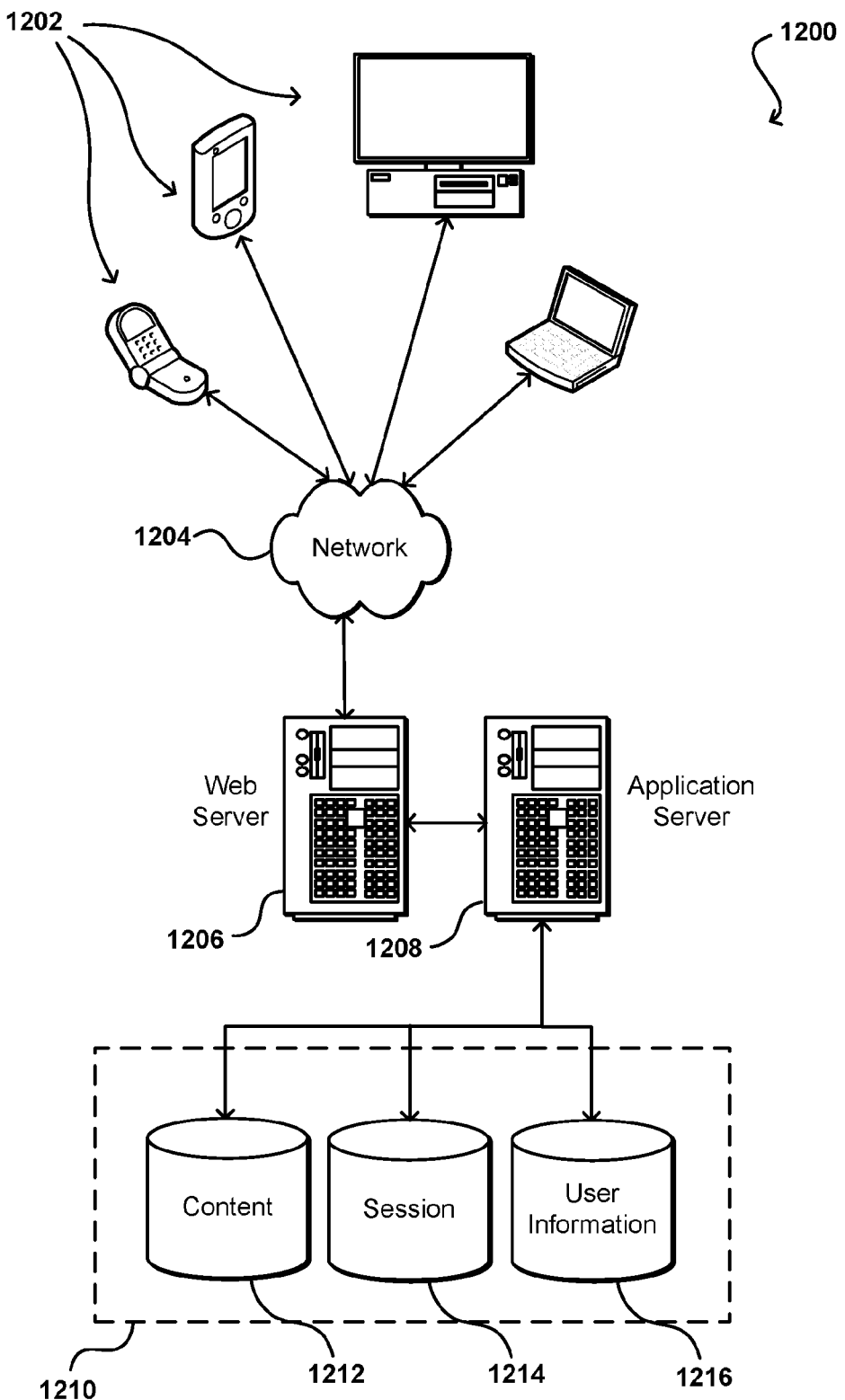
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, NTS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of displaying content on an electronic device, comprising:
    capturing image information using at least one image capture element of the electronic device;
    analyzing, using a processor of the electronic device, the image information to determine a viewing location of a user with respect to the electronic device;
    based at least in part upon the determined viewing location, controlling a rate at which displayed content is scrolled on the electronic device when the determined viewing location is at least partially on a display element of the electronic device, the rate at which the displayed content is scrolled being adjusted as the viewing location of the user moves away from a central portion of the display element;
    determining for the user, using the processor of the electronic device, a target viewing location away from the central portion of the display element; and
    adjusting the rate at which the displayed content is scrolled to substantially direct the viewing location of the user to the target viewing location for at least a period of time,
    wherein the rate at which displayed content is scrolled on the electronic device is controllable by the user through changes in the viewing location of the user away from at least one of the central portion or the target viewing location and without a requirement for physical interaction between the user and the electronic device.

2. The method of claim 1, further comprising:
    selecting a range of target viewing locations for the user with respect to the electronic device; and
    adjusting the scrolling rate when the viewing location for the user falls outside the range of target viewing locations.

3. The method of claim 2, wherein the range of target viewing locations changes over time.

4. The method of claim 2, wherein the scrolling rate is increased when the viewing location is on a first side of the range of target viewing locations and decreased when the viewing location is on a second side of the range of target viewing locations.

5. A computer-implemented method of displaying content on an electronic device, comprising:
    under control of one or more computing systems configured with executable instructions,
        displaying content on a display element of an electronic device;
        determining, using a processor of the electronic device, a gaze direction of a user with respect to the electronic device;
        controlling a rate at which displayed content is scrolled on the display element based at least in part upon the determined gaze direction moving substantially away from a central portion of the display element;
        determining for the user, using the processor of the electronic device, a target viewing location that is directed substantially away from the central portion of the display element; and
        adjusting the rate at which the displayed content is scrolled to substantially direct the gaze direction of the user to the target viewing location for at least a period of time,
    wherein the user is able to adjust the display of content on the display element through changes in gaze direction away from at least one of the central portion of the display element or the target viewing location.

6. The computer-implemented method of claim 5, wherein determining the gaze direction of the user comprises:
    capturing one or more images using at least one image capture element of the electronic device;
    analyzing the captured one or more images to determine the gaze direction of the user.

7. The computer-implemented method of claim 6, wherein analyzing the captured one or more images to determine the gaze direction of the user includes analyzing the one or more images to determine a relative position of the user with respect to the electronic device and determining a relative location of at least one portion of the eyes of the user.

8. The computer-implemented method of claim 6, wherein the image capture element includes at least one of a camera or infrared detector.

9. The computer-implemented method of claim 6, further comprising:
analyzing the captured one or more images to authenticate an identity of a user, the electronic device configured to alter the display of the content based upon the identity of the user.

10. The computer-implemented method of claim 6, further comprising:
maintaining a model for the user useful in displaying content upon the user being authenticated.

11. The computer-implemented method of claim 5, wherein displaying at least a second view of content includes at least one of scrolling the content and displaying a different portion of the content.

12. The computer-implemented method of claim 11, wherein a rate of the scrolling is determined at least in part based upon the gaze direction of the user with respect to the electronic device.

13. The computer-implemented method of claim 12, wherein the rate is determined based upon at least one of a plurality of zones and a rate function.

14. The computer-implemented method of claim 5, wherein the scrolled content corresponds to a display of an image or media file upon the gaze direction of the user falling upon an element associated with that image or media file.

15. The computer-implemented method of claim 5, wherein a default scroll speed for the user is adjusted based at least in part upon adjustments made during viewing of the content by the user.

16. The computer-implemented method of claim 5, wherein the user is able to assign specific actions to regions of the display element, the user able to activate one of those specific actions by gazing at an associated region.

17. The computer-implemented method of claim 5, wherein a default scrolling speed for the content is based at least in part upon a type of the content.

18. The computer-implemented method of claim 5, wherein the scrolled content includes a different page of content, and wherein the scrolled content is displayed further based upon a user moving the gaze direction toward a region associated with a beginning of a new page of content.

19. A computing device, comprising:
a processor;
a display element;
at least one image capture element; and
a memory device including instructions operable to be executed by the processor to perform a set of actions, enabling the processor to:
display content on a display element of an electronic device;
determine, using a processor of the electronic device, a gaze direction of a user associated with a default viewing location with respect to the electronic device;
controlling a rate at which displayed content is scrolled on the display element based at least in part upon the determined gaze direction moving substantially away from a central portion of the display element;
determine for the user, using the processor of the electronic device, a target viewing location that is directed substantially away from the central portion of the display element; and
adjust the rate at which the displayed content is scrolled to substantially direct the gaze direction of the user to the target viewing location for at least a period of time,
wherein the user is able to adjust the display of content on the display element through changes in gaze direction away from at least one of the central portion of the display element or the target viewing location.

20. The computing device of claim 19, wherein determining the gaze direction of the user comprises:
capturing one or more images using at least one image capture element of the electronic device;
analyzing the captured one or more images to determine a relative position of the user and information about the eyes of the user.

21. The computing device of claim 19, wherein the at least one image capture element includes at least one of a camera or infrared detector.

22. The computing device of claim 19, wherein the instructions when executed further cause the computing device to:
analyze the captured one or more images to authenticate an identity of a user, the electronic device configured to alter the display of the content based upon the identity of the user.

23. A non-transitory computer-readable storage medium storing processor-executable instructions for controlling a computing device, comprising:
program code for displaying content on a display element of an electronic device;
program code for determining, using a processor of the electronic device, a gaze direction of a user with respect to the electronic device;
program code for controlling a rate at which displayed content is scrolled on the display element based at least in part upon the determined gaze direction moving substantially away from a central portion of the display element;
program code for determining for the user, using the processor of the electronic device, a target viewing location that is directed substantially away from the central portion of the display element; and
program code for adjusting the rate at which the displayed content is scrolled to substantially direct the gaze direction of the user to the target viewing location for at least a period of time,
wherein the user is able to adjust the display of content on the display element through changes in gaze direction away from at least one of the central portion of the display element or the target viewing location.

24. The non-transitory computer-readable storage medium of claim 23, wherein determining the gaze direction of the user comprises:
capturing one or more images using at least one image capture element of the electronic device;
analyzing the captured one or more images to determine a relative position of the user and information about eye position of the user.

25. The non-transitory computer-readable storage medium of claim 23, further comprising:
program code for analyzing the captured one or more images to authenticate an identity of a user, the electronic device configured to alter the display of the content based upon the identity of the user.

* * * * *